United States Patent
Gunturi et al.

(10) Patent No.: US 12,273,765 B2
(45) Date of Patent: Apr. 8, 2025

(54) METHOD TO REDUCE BLUETOOTH PACKET RETRANSMISSIONS IN NOISY ENVIRONMENT

(71) Applicant: Silicon Laboratories Inc., Austin, TX (US)

(72) Inventors: Karthik Gunturi, Hyderabad (IN); Venkata Naganjaneya Sairam Sriram, Andhra Pradesh (IN); Krishna Chaitanya Suryavenkata Emani, Telangana (IN)

(73) Assignee: Silicon Laboratories Inc., Austin, TX (US)

( * ) Notice: Subject to any disclaimer, the term of this patent is extended or adjusted under 35 U.S.C. 154(b) by 407 days.

(21) Appl. No.: 17/989,261

(22) Filed: Nov. 17, 2022

(65) Prior Publication Data

US 2024/0172030 A1    May 23, 2024

(51) Int. Cl.
*H04W 28/02* (2009.01)
*H04W 72/02* (2009.01)
*H04W 72/542* (2023.01)

(52) U.S. Cl.
CPC ....... *H04W 28/0236* (2013.01); *H04W 72/02* (2013.01); *H04W 72/542* (2023.01)

(58) Field of Classification Search
CPC ........... H04W 28/0236; H04W 72/542; H04W 72/02
See application file for complete search history.

(56) References Cited

U.S. PATENT DOCUMENTS

| | | | |
|---|---|---|---|
| 2018/0006681 A1* | 1/2018 | Bi | H04B 1/715 |
| 2024/0154741 A1* | 5/2024 | Agarwal | H04L 1/0015 |

OTHER PUBLICATIONS

Bluetooth Core Specification, Version 5.4, pp. 286-287; 607-610. Jan. 31, 2023.

\* cited by examiner

*Primary Examiner* — Won Tae C Kim
(74) *Attorney, Agent, or Firm* — Nields, Lemack & Frame, LLC

(57) ABSTRACT

A system and method for minimizing Bluetooth packet retransmission is disclosed. The Bluetooth device creates a channel map as is currently done. However, the Bluetooth device also establishes a "clean channel" threshold. In relatively low noise environments, all of the channels in the channel map may also be considered clean channels, such that all of the channels in the channel map are used for Bluetooth packet transmissions. However, in noisy environments, some of the channels in the channel map may not be denoted as "clean channels". In this situation, the Bluetooth device may transmit NULL or POLL packets when these channels are scheduled to be used and transmit the actual data packet in the next scheduled slot on a clearer channel.

18 Claims, 4 Drawing Sheets

METHOD TO REDUCE BLUETOOTH PACKET RETRANSMISSIONS IN NOISY ENVIRONMENT

FIELD

This disclosure describes systems and methods to minimize Bluetooth packet retransmissions in a noisy environment, and more specifically, minimizing retransmissions when very few good channels are available.

BACKGROUND

Bluetooth is one of many wireless networks that are gaining popularity in the 2.4 GHz frequency band. The proliferation of networks, especially in the 2.4 GHz frequency band, has led to challenges for those attempting to utilize multiple network protocols. For example, ZigBee, BlueTooth Low Energy (BLE) and WiFi all operate in the 2.4 GHz spectrum. Consequently, these various protocols may interfere with one another, resulting in reductions in throughput or data loss.

To attempt to mitigate this, Bluetooth implements a frequency hopping algorithm known as adaptive frequency hopping (AFH). Bluetooth supports 79 channels, while BLE supports 40 channels. This large number of channels is intended to make it possible for Bluetooth devices to communicate on quiet channels, even in the presence of other devices and other networks.

The Bluetooth device may monitor all of these channels and, using one or more parameters, may create a channel map, which indicates the best channels to use. The Bluetooth specification indicates that each device must use at least 20 of these channels.

However, in noisy environments, such as crowded places including apartment buildings, shopping malls and others, it may be unlikely that there are at least 20 channels that are not noisy.

Therefore, it would be beneficial if there were a system and method that allowed Bluetooth devices to conform to the Bluetooth specification, but to minimize the number of retransmissions that are needed due to noisy channels. Further, it would be advantageous if the system and method were easily implemented.

SUMMARY

A system and method for minimizing Bluetooth packet retransmission is disclosed. The Bluetooth device creates a channel map as is currently done. However, the Bluetooth device also establishes a "clean channel" threshold. In relatively low noise environments, all of the channels in the channel map may also be considered clean channels, such that all of the channels in the channel map are used for Bluetooth packet transmissions. However, in noisy environments, some of the channels in the channel map may not be denoted as "clean channels". In this situation, the Bluetooth device may transmit NULL or POLL packets when these channels are scheduled to be used and transmit the actual data packet in the next scheduled slot on a clearer channel.

According to one embodiment, method of reducing retransmissions in a Bluetooth network is disclosed, wherein the Bluetooth network utilizes frequency hopping using a plurality of channels. The method comprises creating a channel map using a channel selection procedure, the channel map indicating channels of the plurality of channels that a device will utilize to transmit packets; selecting channels within the channel map having interference below a maximum acceptable interference threshold, the selected channels referred to as a preferred channel list; determining that a data packet needs to be transmitted; identifying an identity of a channel to be used next for transmission; transmitting the data packet if the channel to be used next is included in the preferred channel list; and transmitting a disposable packet if the channel to be used next is not included in the preferred channel list. In some embodiments, the channel selection procedure measures RSSI of each channel and creates the channel map based on the channels with a lowest RSSI. In certain embodiments, the preferred channel list comprises the channels with a RSSI below a predetermined threshold. In some embodiments, the channel selection procedure uses information from received packets to determine bit error rate or packet error rate, and creates the channel map based on the error rate. In certain embodiments, the preferred channel list comprises the channels with an error rate below a predetermined threshold. In some embodiments, the disposable packet comprises a NULL packet or a POLL packet.

According to another embodiment, a non-transitory computer readable storage device, disposed on a Bluetooth network device is disclosed. The non-transitory computer readable storage device comprising instructions, which when executed by a processing unit, enable the Bluetooth network device to: create a channel map using a channel selection procedure, the channel map indicating channels of a plurality of channels that a device will utilize to transmit packets; select channels within the channel map having interference below a maximum acceptable interference threshold, the selected channels referred to as a preferred channel list; determine that a data packet needs to be transmitted; identify an identity of a channel to be used next for transmission; transmit the data packet if the channel to be used next is included in the preferred channel list; and transmit a disposable packet if the channel to be used next is not included in the preferred channel list. In some embodiments, the channel selection procedure measures RSSI of each channel and creates the channel map based on the channels with a lowest RSSI. In certain embodiments, the preferred channel list comprises the channels with a RSSI below a predetermined threshold. In some embodiments, the channel selection procedure uses information from received packets to determine bit error rate or packet error rate, and creates the channel map based on the error rate. In certain embodiments, the preferred channel list comprises the channels with an error rate below a predetermined threshold. In some embodiments, the disposable packet comprises a NULL packet or a POLL packet.

According to another embodiment, a Bluetooth network device is disclosed. The Bluetooth device comprises a network interface capable of transmitting on a plurality of channels; a processing unit; and a memory device in communication with the processing unit, wherein the memory device comprises instruction, which when executed by the processing unit, enable the Bluetooth network device to: create a channel map using a channel selection procedure, the channel map indicating channels of the plurality of channels that a device will utilize to transmit packets; select channels within the channel map having interference below a maximum acceptable interference threshold, the selected channels referred to as a preferred channel list; determine that a data packet needs to be transmitted; identify an identity of a channel to be used next for transmission; transmit the data packet if the channel to be used next is included in the preferred channel list; and transmit a disposable packet if the channel to be used next is not included in the preferred channel list. In some embodiments, the channel selection procedure measures RSSI of each channel and creates the channel map based on the channels with a lowest RSSI. In certain embodiments, the preferred channel list comprises the channels with a RSSI below a predetermined threshold. In some embodiments, the channel selection procedure uses information from received packets to determine bit error rate or packet error rate, and creates the channel map based on the error rate. In certain embodiments, the preferred channel list comprises the channels with an error rate below a predetermined threshold. In some embodiments, the disposable packet comprises a NULL packet or a POLL packet.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
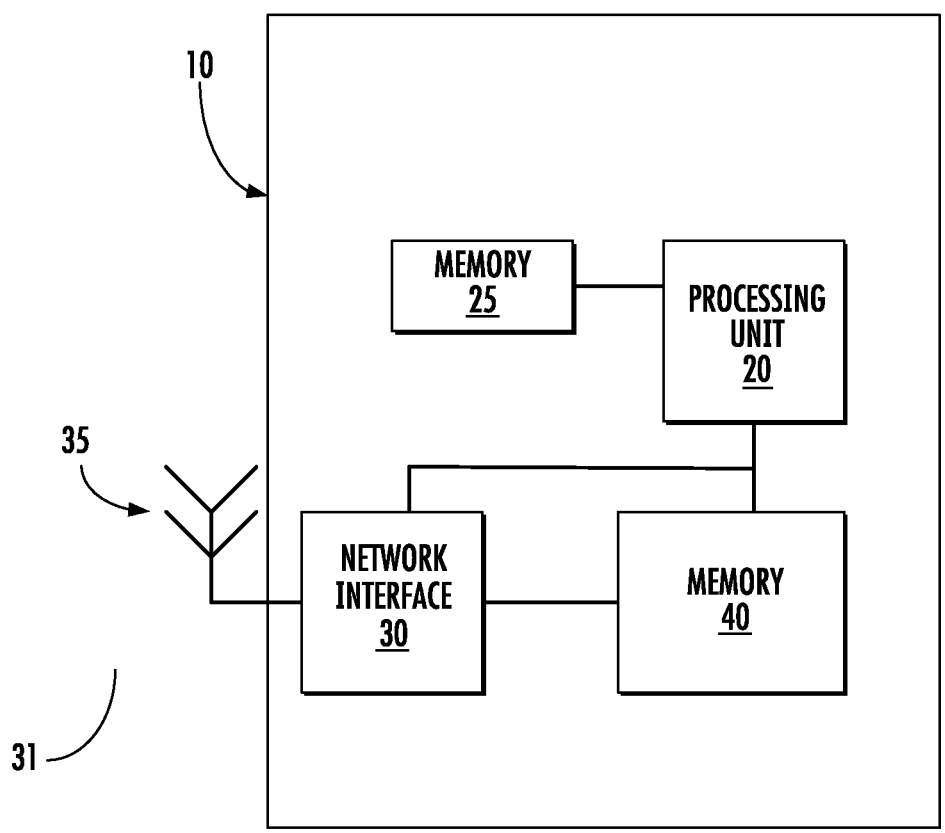
FIG. 1 is a block diagram of the Bluetooth network device.

FIG. 1 shows a block diagram of a representative Bluetooth network device 10 that minimizes retransmissions according to one embodiment.

The Bluetooth network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the Bluetooth network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the Bluetooth network device 10. The instructions contained on this second computer readable non-transitory media may be downloaded onto the memory device 25 to allow execution of the instructions by the Bluetooth network device 10.

The Bluetooth network device 10 also includes a network interface 30, which may be a wireless interface that connects with an antenna 35. The network interface 30 may support Bluetooth.

The Bluetooth network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the wireless Bluetooth network 31. Although not shown, the Bluetooth network device 10 also has a power supply, which may be a battery or a connection to a permanent power source, such as a wall outlet.

While the processing unit 20, the memory device 25, the network interface 30, and the second memory device 40 are shown in FIG. 1 as separate components, it is understood that some or all of these components may be integrated into a single electronic component. Rather, FIG. 1 is used to illustrate the functionality of the Bluetooth network device 10, not its physical configuration.

As noted above, Bluetooth supports an adaptive frequency hopping algorithm. In operation, the Bluetooth network device 10 monitors the channels and creates a channel map that relates the different channel numbers to one or more parameters that may be representative of the amount of interference on that channel. Based on this channel map, the Bluetooth network device 10 selects the channels which it will use to communicate with another Bluetooth device. This may be referred to as a channel selection procedure. As noted above, the channel selection procedure will result in at least some minimum number of channels that are to be used. In certain embodiments, this minimum number is 20. In other words, although Bluetooth defines 79 channels, the Bluetooth network device 10 may utilize as few as 20 channels for data packet transmissions.

The channel selection procedure of determining which channels are best to use may be performed using different parameters. For example, Received Signal Strength Indication (RSSI) and packet error rates, or a combination thereof, may be used to classify the channels.

In an RSSI-based approach, each channel may be measured when the Bluetooth network device 10 is neither transmitting nor receiving data. If the background RSSI is deemed to be excessively high, there may be interference on the channel, and the channel may be categorized as noisy. The amount of RSSI may be used to calculate a score which is indicative of the amount of interference. This method may also be used in channels that have previously been classified as "good" in the current channel map to further verify that the channel is still clear for an error free transmission.

In a packet error-based approach, received message packets may be parsed to determine the state of the link. For example, packet error rate, bit error rate, or errors in access code, header or payload may be examined to determine the quality of the link. Errors in different parts of the packet may be evaluated differently. For example, an error in a packet header, which does not have forward error correction, may be deemed to be more significant than an error in a payload. If the error rate or position of errors is unacceptable, the channel is categorized as having a high level of interference. In some embodiments, the packet error rate, the bit error rate and the specific locations of the errors may be used to generate a score which is indicative of the amount of interference. In certain embodiments, a combination of the RSSI-based approach and the packet error-based approach may be used, where the packet error-based approach is used on channels currently in use, and the RSSI-based approach is used on the unused channels on which no packets are being received.

Thus, using these approaches, a channel map may be created, where the channel map identifies the specific channels that will be used when communicating with a second Bluetooth device. This channel map is then communicated to the remote network device so that the remote device is able to switch to the correct frequency to receive data packets from the Bluetooth network device 10. These channels are typically those with the least interference. However, it is noted that channels which are categorized as noisy channels may necessarily be included in the channel map if there are not enough low interference channels to meet the required minimum number of channels.

In other words, it is possible that one or more of the channels in the channel map is considered to be noisy. Consequently, although the Bluetooth specification mandates the use of at least 20 channels, there is no guarantee that all of these channels are considered to be clean channels.

Thus, in certain embodiments, the Bluetooth network device 10 creates a preferred channel list, which is the list of channels that will be used by the Bluetooth network device to transmit actual data packets. This preferred channel list may be a subset of the channels in the channel map. Specifically, when the RSSI and/or packet error-based approaches are performed, the Bluetooth network device 10 may quantify the interference present in each channel and create a list in ascending order of interference. The Bluetooth network device 10 then creates the channel map by setting a maximum acceptable interference threshold and using all of the channels below this threshold. The maximum acceptable interference threshold may be chosen so as to achieve an error rate below a certain level. If there are not the minimum number of channels that meet this threshold, the Bluetooth network device 10 adds additional channels until this minimum number of channels is reached. The Bluetooth network device 10 may then create the preferred channel list as those channels below this maximum acceptable interference threshold, regardless of the number of channels. Thus, in an RSSI-based approach, those channels with a RSSI below a predetermined threshold may be included in the preferred channel list. In a packet-based approach, those channels with an error rate less than a predetermined threshold may be included in the preferred channel list. In other words, the preferred channel list may be the same as the channel map in low noise environments, but may contain fewer channels in noisy environments. In some embodiments, at least one channel in the channel list is not part of the preferred channel list.

Figure 2:
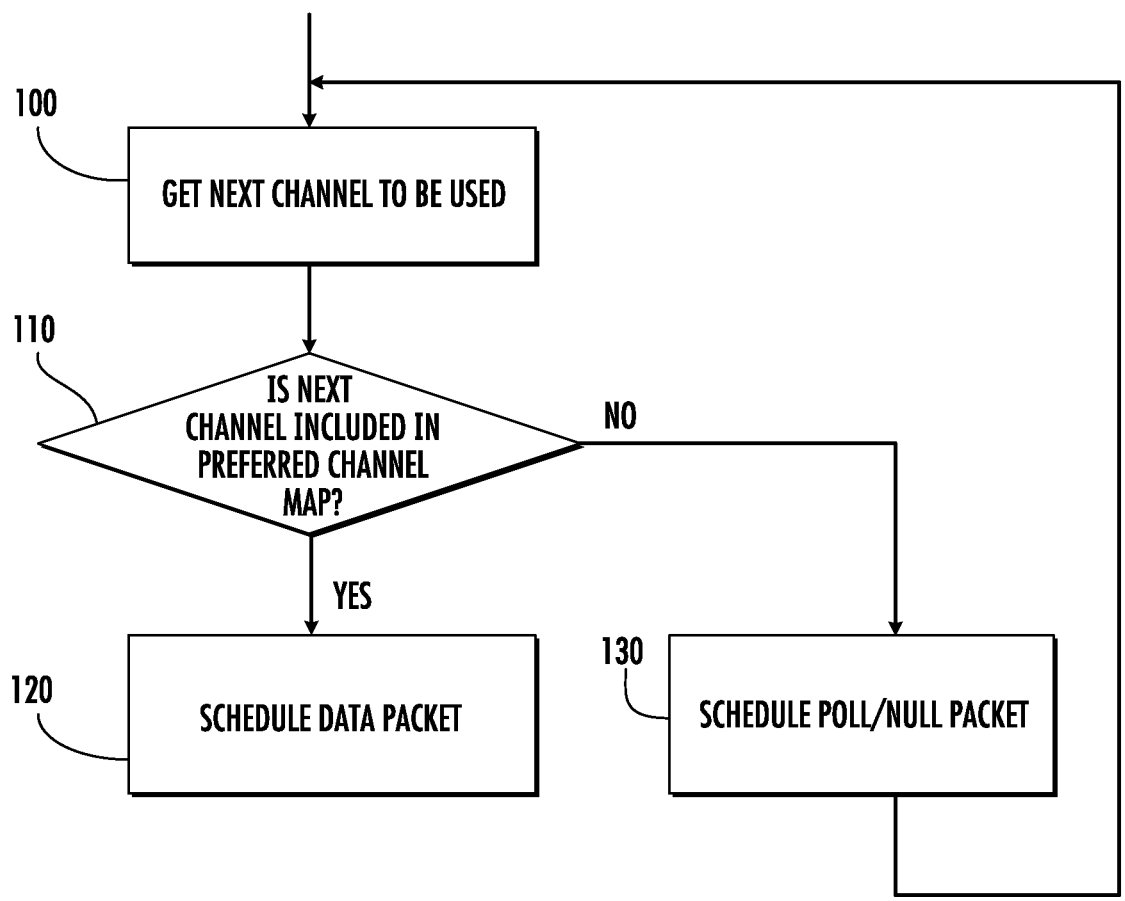
FIG. 2 is a flowchart showing the operation of the Bluetooth network device according to one embodiment.

FIG. 2 shows the operation of the Bluetooth network device 10 in accordance with one embodiment. At some point in time, the Bluetooth network device 10 may wish to transmit a data packet. However, before scheduling the delivery of that data packet, the Bluetooth network device 10 checks which channel is to be used in the next transmission, as shown in Box 100. This channel is chosen based on the sequence in the channel map. Next, the Bluetooth network device 10 checks if the next channel is part of the preferred channel list, as shown in Box 110. If the next channel is part of the preferred channel list, the Bluetooth network device 10 schedules the transmission of the data packet, as shown in Box 120. However, if the next channel is not part of the preferred channel list, this indicates that the channel is noisy.

Thus, rather than trying to transmit the data packet, the Bluetooth network device 10 transmits a different type of packet that may be considered disposable, as shown in Box 130. For example, NULL packets may be transmitted by the Bluetooth network device 10 to the remote device to maintain synchronization. NULL packets do not require a confirmation or response. Thus, if the NULL packet is corrupted, there is no need to retransmit it. Alternatively, the Bluetooth network device 10 may transmit a POLL packet. POLL packets require a response from the remote device.

After the Bluetooth network device 10 transmits the disposable packet, it returns back to Box 100. This sequence repeats until the next channel to transmit on is one of the preferred channels.

In certain embodiments, the number of consecutive disposable packets that are transmitted may be limited. For example, the device may have a maximum number, wherein, if that maximum number is reached, the device will transmit a data packet, even if the channel is not on the preferred channel list. In this way, the number of consecutive POLL or NULL packets is limited.

The system and method have many advantages. By limiting the transmission of data packets to channels that are less noisy, the number of retransmissions may be reduced. For example, WIFI may use non-overlapping Channels 1, 6 and 11, which cover the frequency ranges 2401 MHz-2423 MHz, 2426 MHz-2448 MHz and 2451 MHz-2473 MHz, respectively. This leaves only 11 frequencies that are not utilized by WIFI: 2424, 2445, 2449, 2450, 2474, 2475, 2476, 2477, 2478, 2479 and 2480 MHz. Consequently, a current Bluetooth network device attempts to send data packets on at least 9 channels that are also occupied by WIFI, leading to packet retransmissions and packet loss. The present system and method alleviate this problem may only transmitting data packets on those channels that are deemed to have low noise.

Figure 3A:
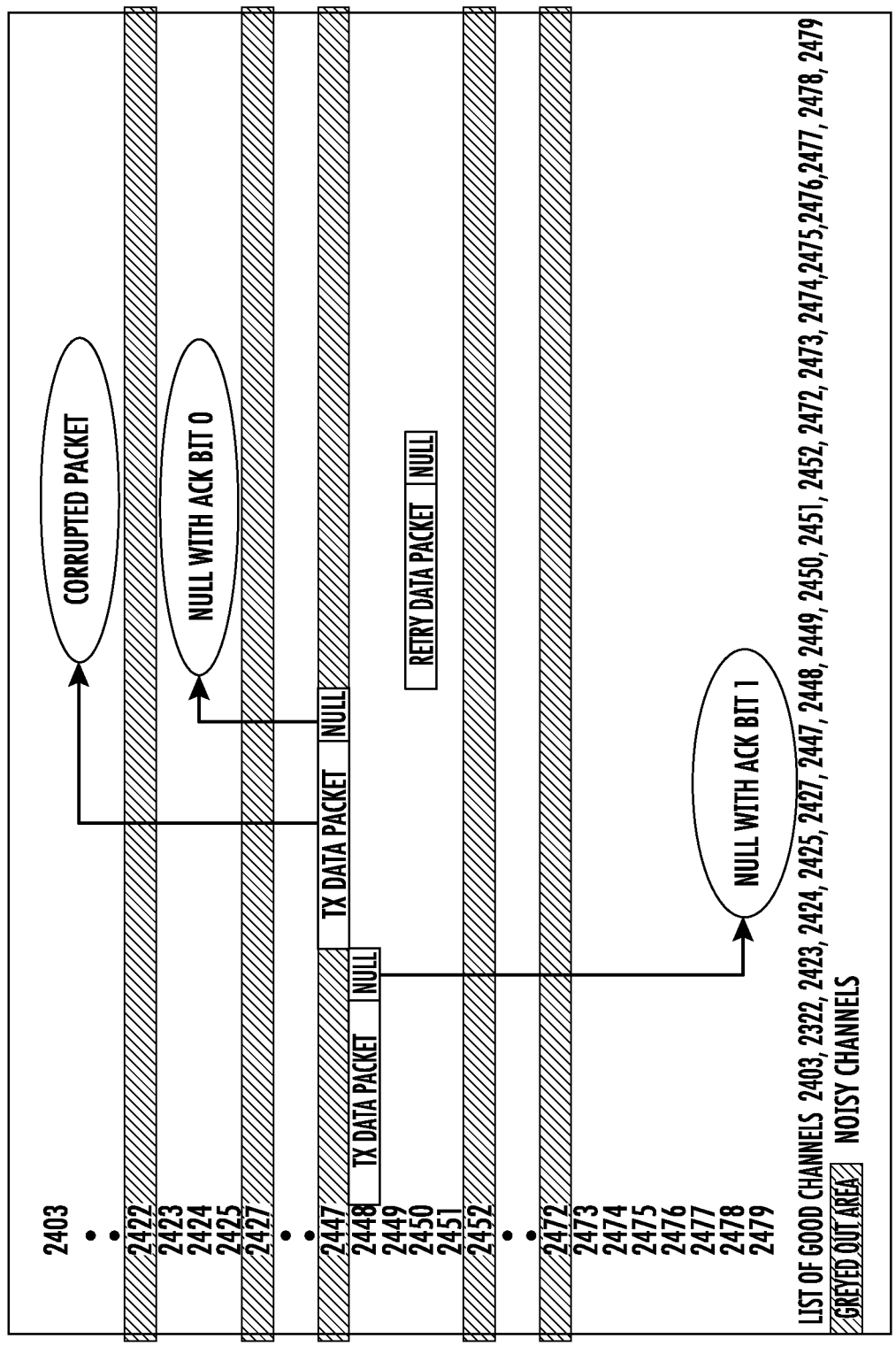
FIGS. 3A-3B show a comparison of the prior art to the present system.
Figure 3B:
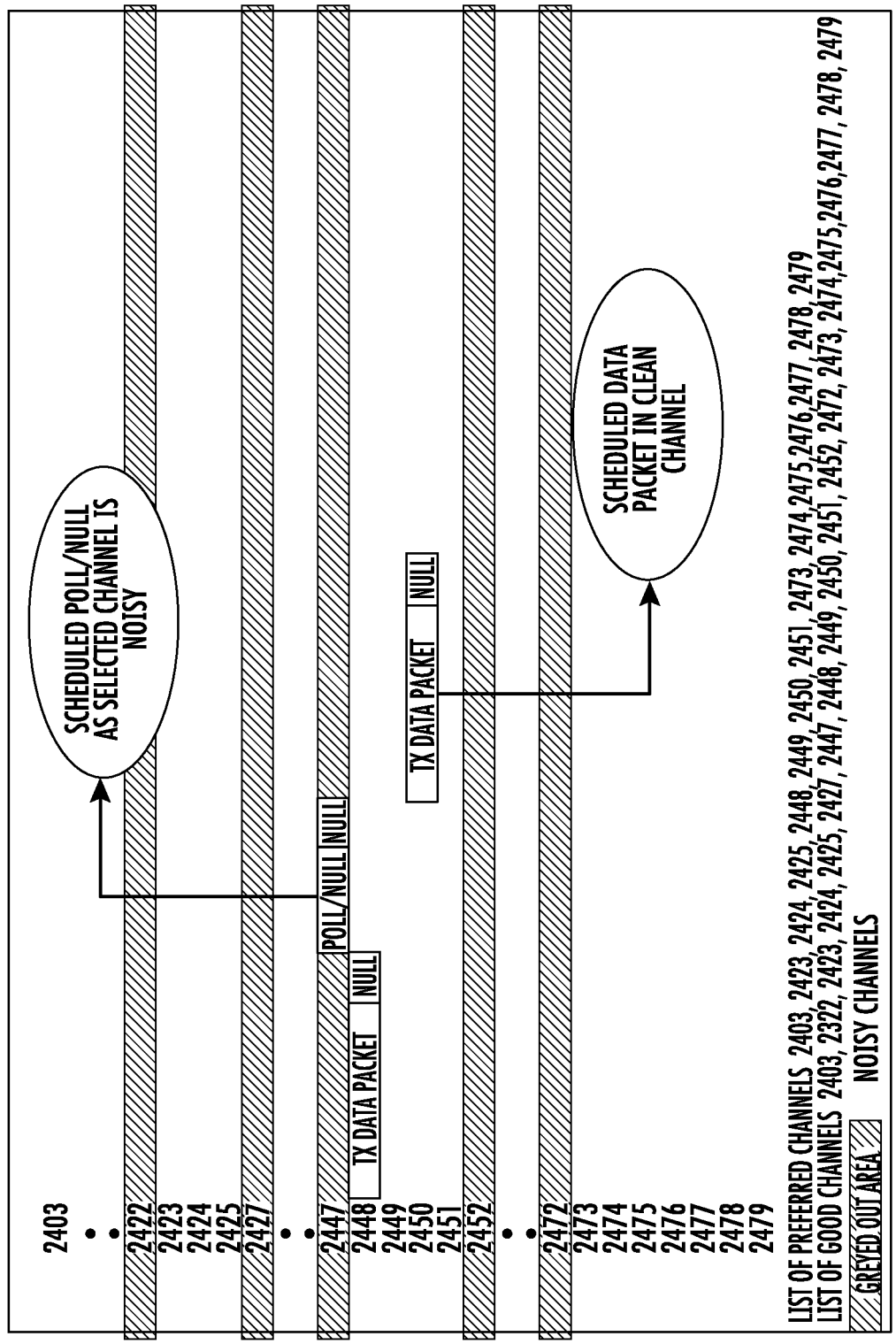

FIGS. 3A-3B illustrate the benefits of this system and method. FIG. 3A shows a traditional Bluetooth system, while FIG. 3B shows the system described in this disclosure. In both diagrams, certain channels are considered to be noisy. Specifically, the channels at frequencies 2422, 2427, 2447, 2452 and 2472 MHz are considered to be noisy channels. However, these channels are part of the channel map because they were needed to meet the minimum number of channels. Further, the vertical axis represents the channel that the packets are transmitted on, while the horizontal axis represents time. In FIG. 3A, a first data packet is transmitted by the network device on channel 2448 MHz successfully. The device then hops to 2447 MHz, which is the next entry in the channel map. However, although this channel is part of the channel map, there is a significant amount of interference on this channel. Consequently, the data packet is corrupted and is not received by the intended recipient. Because this packet was not received, the network device must retransmit the data packet on channel 2450.

FIG. 3B shows the same sequence using the method disclosed herein. Thus, a first data packet is transmitted on the channel at 2448 MHz. The network device then hops to 2447 MHz, as described above. However, in this example, the network device realizes that, although in the channel map, this channel is not part of the preferred channel list. Consequently, the network device transmits a disposable packet, such as a POLL or NULL packet. The network device then jumps to 2450 MHz and transmits the second data packet.

While the total number of packets that are transmitted is the same in both scenarios, it is noted that NULL or POLL packets are much smaller than data packets.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of reducing retransmissions in a Bluetooth network, wherein the Bluetooth network utilizes frequency hopping using a plurality of channels, comprising:
   creating a channel map using a channel selection procedure, the channel map indicating channels of the plurality of channels that a device will utilize to transmit packets;
   selecting channels within the channel map having interference below a maximum acceptable interference threshold, the selected channels referred to as a preferred channel list;
   determining that a data packet needs to be transmitted;
   identifying an identity of a channel to be used next for transmission;
   transmitting the data packet if the channel to be used next is included in the preferred channel list; and
   transmitting a disposable packet if the channel to be used next is not included in the preferred channel list.

2. The method of claim 1, wherein the channel selection procedure measures RSSI of each channel and creates the channel map based on the channels with a lowest RSSI.

3. The method of claim 2, wherein the preferred channel list comprises the channels with a RSSI below a predetermined threshold.

4. The method of claim 1, wherein the channel selection procedure uses information from received packets to determine bit error rate or packet error rate, and creates the channel map based on the error rate.

5. The method of claim 4, wherein the preferred channel list comprises the channels with an error rate below a predetermined threshold.

6. The method of claim 1, wherein the disposable packet comprises a NULL packet or a POLL packet.

7. A non-transitory computer readable storage device, disposed on a Bluetooth network device, comprising instructions, which when executed by a processing unit, enable the Bluetooth network device to:
   create a channel map using a channel selection procedure, the channel map indicating channels of a plurality of channels that a device will utilize to transmit packets;
   select channels within the channel map having interference below a maximum acceptable interference threshold, the selected channels referred to as a preferred channel list;
   determine that a data packet needs to be transmitted;
   identify an identity of a channel to be used next for transmission;
   transmit the data packet if the channel to be used next is included in the preferred channel list; and
   transmit a disposable packet if the channel to be used next is not included in the preferred channel list.

8. The non-transitory computer readable storage device of claim 7, wherein the channel selection procedure measures RSSI of each channel and creates the channel map based on the channels with a lowest RSSI.

9. The non-transitory computer readable storage device of claim 8, wherein the preferred channel list comprises the channels with a RSSI below a predetermined threshold.

10. The non-transitory computer readable storage device of claim 7, wherein the channel selection procedure uses information from received packets to determine bit error rate or packet error rate, and creates the channel map based on the error rate.

11. The non-transitory computer readable storage device of claim 10, wherein the preferred channel list comprises the channels with an error rate below a predetermined threshold.

12. The non-transitory computer readable storage device of claim 7, wherein the disposable packet comprises a NULL packet or a POLL packet.

13. A Bluetooth network device, comprising:
   a network interface capable of transmitting on a plurality of channels;
   a processing unit; and
   a memory device in communication with the processing unit, wherein the memory device comprises instruction, which when executed by the processing unit, enable the Bluetooth network device to:
   create a channel map using a channel selection procedure, the channel map indicating channels of the plurality of channels that a device will utilize to transmit packets;
   select channels within the channel map having interference below a maximum acceptable interference threshold, the selected channels referred to as a preferred channel list;
   determine that a data packet needs to be transmitted;
   identify an identity of a channel to be used next for transmission;
   transmit the data packet if the channel to be used next is included in the preferred channel list; and
   transmit a disposable packet if the channel to be used next is not included in the preferred channel list.

14. The Bluetooth network device of claim 13, wherein the channel selection procedure measures RSSI of each channel and creates the channel map based on the channels with a lowest RSSI.

15. The Bluetooth network device of claim 14, wherein the preferred channel list comprises the channels with a RSSI below a predetermined threshold.

16. The Bluetooth network device of claim 13, wherein the channel selection procedure uses information from received packets to determine bit error rate or packet error rate, and creates the channel map based on the error rate.

17. The Bluetooth network device of claim 16, wherein the preferred channel list comprises the channels with an error rate below a predetermined threshold.

18. The Bluetooth network device of claim 13, wherein the disposable packet comprises a NULL packet or a POLL packet.

* * * * *